United States Patent [19]

Eves, II

[11] Patent Number: 4,882,984

[45] Date of Patent: Nov. 28, 1989

[54] CONSTANT TEMPERATURE FRYER ASSEMBLY

[75] Inventor: E. Eugene Eves, II, Westford, Mass.

[73] Assignee: Raytheon Company, Lexington, Mass.

[21] Appl. No.: 255,084

[22] Filed: Oct. 7, 1988

[51] Int. Cl.$^4$ .................................................. A47J 37/12
[52] U.S. Cl. ........................................ 99/404; 99/406; 99/407; 99/408; 99/443 C
[58] Field of Search ................. 99/403, 404, 405, 406, 99/408, 443 C

[56] References Cited

U.S. PATENT DOCUMENTS

| | | | |
|---|---|---|---|
| 1,401,945 | 12/1921 | Morris | 99/406 |
| 1,707,786 | 4/1929 | Ehrhart | 99/406 |
| 2,652,767 | 7/1953 | Childs | 99/408 |
| 3,504,619 | 4/1970 | Fester et al. | 99/405 |
| 3,637,401 | 1/1972 | Kuhlmah | 99/404 X |
| 3,708,311 | 1/1973 | Bolton et al. | 99/403 X |
| 3,733,202 | 5/1973 | Marmor | 99/408 |
| 3,861,289 | 1/1975 | Baker et al. | 99/443 C X |
| 4,026,202 | 5/1977 | Szpur | 99/443 C X |
| 4,189,994 | 2/1980 | Schmader | 99/406 X |
| 4,234,612 | 11/1980 | Sakakibara et al. | 99/404 X |
| 4,623,544 | 11/1986 | Highnote | 99/330 |
| 4,628,804 | 12/1986 | Belshaw et al. | 99/404 |
| 4,745,935 | 5/1988 | P'Alterio | 99/405 |

FOREIGN PATENT DOCUMENTS

821027 9/1959 United Kingdom .................. 99/403

Primary Examiner—Stephen Marcus
Assistant Examiner—Christine A. Peterson
Attorney, Agent, or Firm—Steven C. Stewart; William R. Clark; Richard M. Sharkansky

[57] ABSTRACT

A constant temperature fryer assembly having a conveyor for cooking food in oil at a predetermined constant temperature. The fryer is constructed having an external heat exchanger for heating the oil. Oil is removed from the fryer, pumped through the heat exchanger and then pumped back into the fryer through a series of aperatures. The aperatures are positioned in the fryer to provide predetermined temperature at various positions along the conveyor, thereby maintaining a controlled cooking environment.

26 Claims, 7 Drawing Sheets

CONSTANT TEMPERATURE FRYER ASSEMBLY

BACKGROUND OF THE INVENTION

This invention relates generally to devices for cooking food type items such as french fries, chicken, fish and the like in an industrial fryer.

Industrial fryers are typically constructed with a tank that holds oil and a device that generates hot gas that runs through individually fired, densely packed pipes built into the bottom of the tank. The pipes become hot causing the oil to be heated to a high temperature. Food then is placed on a conveyor and transported through the oil. When a batch of cold food to be cooked is immersed in the cooking oil, a substantial temperature drop generally occurs. This temperature drop is highly undesirable.

With an industrial fryer, it is desirable to have controlled longitudinal temperature profiles within the fryer so that the food may be cooked at different temperatures optimized for the particular product. By longitudinal profile, it is meant that the temperature of oil at the different locations along the path of food flow has a defined characteristic. When one large volume of product is passing through and thus receiving a large amount of heat, the oil in that region would tend to get cooler unless increased heat were input to the oil in that region. Further, with a fixed gas pipe arrangement, there is a predefined limit as to how heat can be input in a region. For example, the apparent way to increase the input heat (i.e. number of BTU's transferred) would be to increase the temperature of the pipes by firing the burners hotter. However, there is a practical limit such as, for example, 450° or 500° F. above which the pipes cannot be raised without degrading the oil at an unsatisfactory rate. For example, if the pipes were maintained at a temperature of approximately 500° F., the oil contacting the surface of the pipes would degrade at a rate which would require the oil to be changed relatively frequently. As a result, to obtain a desired longitudinal profile, certain regions or zones are reduced in temperature rather than increasing a relatively higher temperature zone above a practical limit.

Another drawback of this well-known device is that as heat flow is derived from free convection, dead spots, where the food is at an unpredictable temperature may occur throughout the oil. A third drawback of the hot gas fryer is that as the pipes located on the bottom of the pan are heated to high temperature, charring or soot may occur on the pipes. This charring or soot causes the fryer to operate at a lower efficiency.

U.S. Pat. No. 4,623,544 to Highnote discloses a batch type fryer/cooker assembly for cooking foods at a predetermined constant temperature. The oil is removed from the cooking chamber, filtered, heated, and then turbulently recycled back to the cooking chamber. However, because the system is a batch system, the food throughout is severely restricted. Also, because the food is stationary, it is impractical to obtain a changing temperature profile during the cooking of a particular food product.

SUMMARY OF THE INVENTION

An object of the present invention is to provide an improved conveyorized fryer/cooker assembly.

Another object of the invention is to provide a conveyorized fryer assembly having a plurality of longitudinal regions wherein the cooking oil in each region is maintained at a precise constant temperature, even though a relatively high volume of food products are constantly being introduced into the fryer.

Another object of the present invention is to provide a fryer with a conveyor that transports food through a plurality of different temperature zones.

A further object of the present invention is to provide a cooking tank having a high-efficiency temperature heating structure with a bypass valve that allows transfer of heat from one part of the tank to another part.

An additional object of the present invention is to provide a fryer assembly which will have sufficient filtration of contaminants and food particles to prevent transfer of food taste from one type of product to another.

An additional object of the present invention is to provide a conveyorized system which is easily removable from the oil of a fryer for cleaning.

A further object of the present invention is to provide a fryer assembly that has a manifold assembly for dispersing oil which can be reconfigured to change the temperature profile longitudinally within the cooking oil.

Another object of the present invention is to uniformly discharge hot oil along the surface of the cooking oil within the fryer.

Another object of the present invention is to provide a fryer that contains cooking oil having uniform lateral temperature to provide consistency in the cooking of food.

These and other objects of the invention are obtained generally by providing a fryer assembly comprising a tank containing cooking oil and conveyor means for transporting food through the cooking oil in the tank. Also provided is means for draining oil from the tank, heat exchanger means for heating the oil drained from the tank to a predetermined temperature, and means for forming a plurality of uniform temperature zones with the heated oil along the path of food flow. It may be preferable that the apparatus further comprise thermostat control means sensitive to the temperature of the cooking oil, and control means electrically connected to the thermostat control means and the heat exchange means for energizing the heat exchange means when the temperature of the cooking oil drops. It may also be preferable that the forming means comprise a plurality of apertures which direct oil downward into the tank and onto the food. It may further be preferable that the forming means is mounted within the tank for easy removal therefrom. Additionally, it may be preferable that the fryer assembly further comprise means for bypassing the heat exchanging means to transfer heat from one part of the tank to another part. It may additionally be preferable that the forming means include a pipe having a plurality of apertures directing hot oil downward into the oil in the tank and over the food. It may further be preferable that the pipe extend laterally across the tank, such that the temperature of the hot oil within the pipe varies by less than 10° F.

DESCRIPTION OF THE PREFERRED EMBODIMENTS

Figure 1:
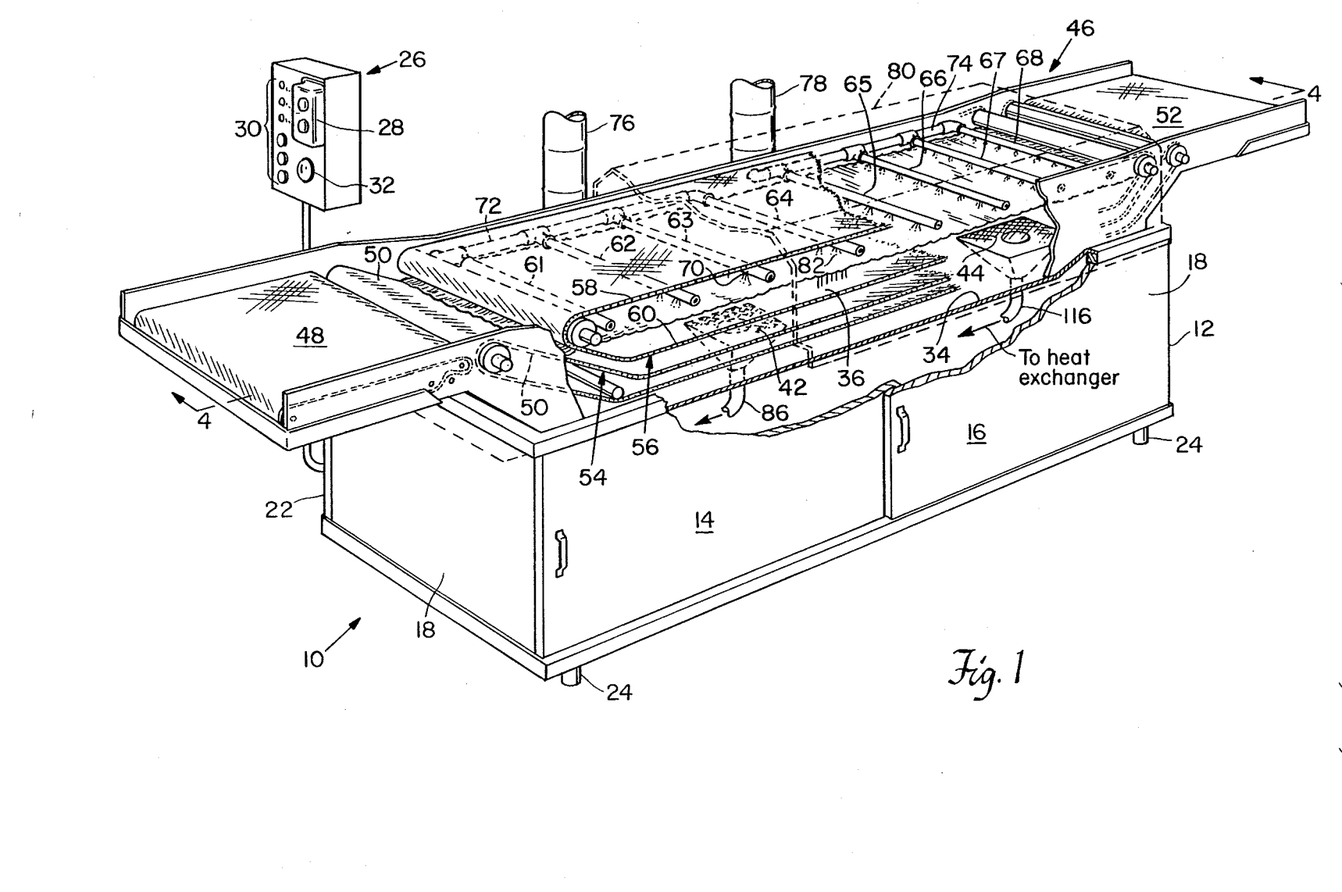
FIG. 1 is a perspective view of the fire cooker assembly of the present invention.

Referring to FIG. 1 of the drawings, reference numeral 10 indicates the fryer/cooker assembly of the present invention. The fryer/cooker assembly has a fryer base 12 with front and rear side doors 14 and 16, respectively, for internal access to the pump and heater structure. Also connected to the fryer/cooker assembly 10 is front panel 18, rear panel 20 FIG. 9) and left side panel 22 (FIG. 9). Each corner of the fryer/cooker assembly 10 is provided with legs 24. Also connected to the fryer base 12 is control panel 26 that contains a master switch 28, cooking controls 30 and indicator gauges 32.

Figure 4:
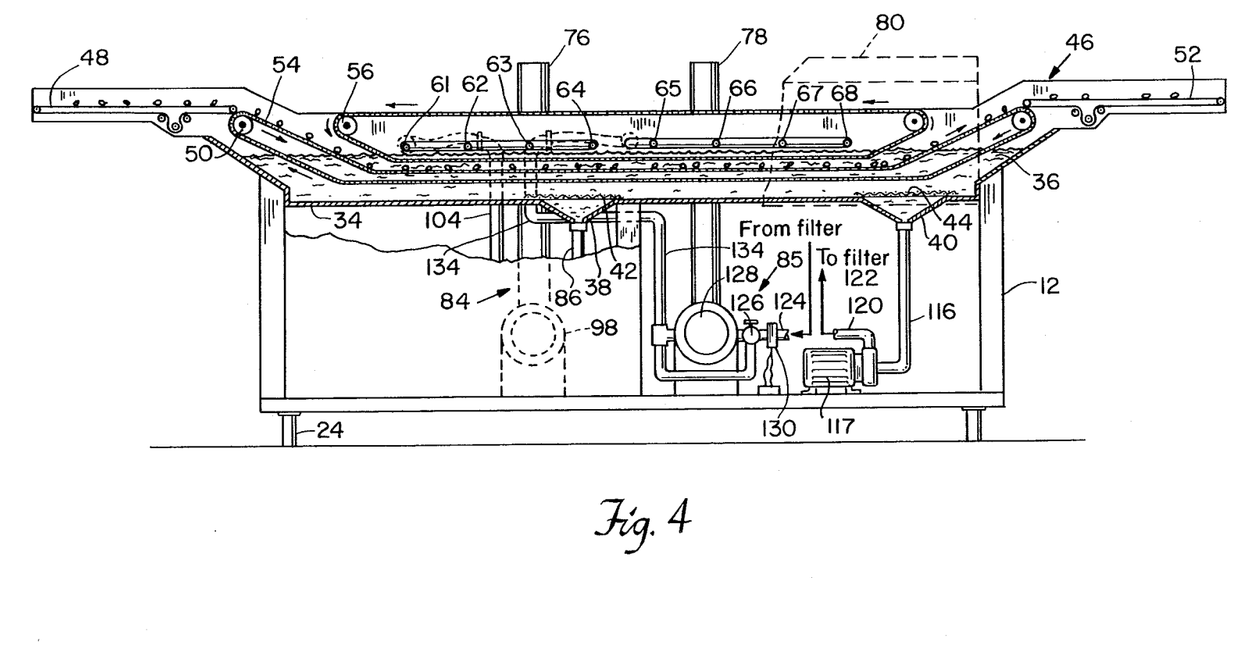
FIG. 4 is a cross-sectional view taken along line 4—4 of FIG. 1.

Referring to FIGS. 1 and 4, mounted on the fryer base 12 is a cooking oil tank 34 which contains hot oil 36. Connected to the bottom of the cooking oil tank 34 is front drain 38 and rear drain 40. Covering the front drain 38 and rear drain 40 are front particle screen 42 and rear particle screen 44 that prevent large particles within the hot oil 36 from falling down the drain 38 or 40.

Mounted on the fryer base 12 is a conveyor and manifold assembly 46. The conveyor and manifold assembly 46 has a transport conveyor having a inlet portion 48, submerged portion 50 and outlet portion 52 to transport food 54 through the cooking oil 36. Conveyor and manifold assembly 46 also has a hold down conveyor 56 which keeps food 54 mounted on the submerged portion 50 when being transported through hot oil 36.

Connected to conveyor and manifold assembly 46 and mounted between the belts 58 and 60 of hold down conveyor 56 are dispersing manifolds 61–68. Attached to the bottom of dispersing manifold 61–68 are nozzles 70. The first four dispersing manifolds (61–64) are connected to a front manifold headter 72 and the second four dispersing manifolds (65–68) are connected to a rear manifold header 74. The front and rear manifold headers 72 and 74 are connected through various piping to heat exchangers 98 and 128 (FIG. 4). A detail of these heat exchangers 98 and 128 will be explained in more detail later. Also connected to heat exchangers 98 and 118, respectively, are front stack 76 and rear stack 78. These front and rear stacks 76 and 78 allow exhaust from heat exchangers 98 and 118 to escape.

Mounted over the fryer base 12 and conveyor and manifold assembly 46 is top removable cover 80. The top removable cover 80 is provided to prevent oil 36, and moisture from food 54 contacting the hot oil 36 from splashing onto the area surrounding the fryer/cooker assembly 10.

Figures 2, 3:
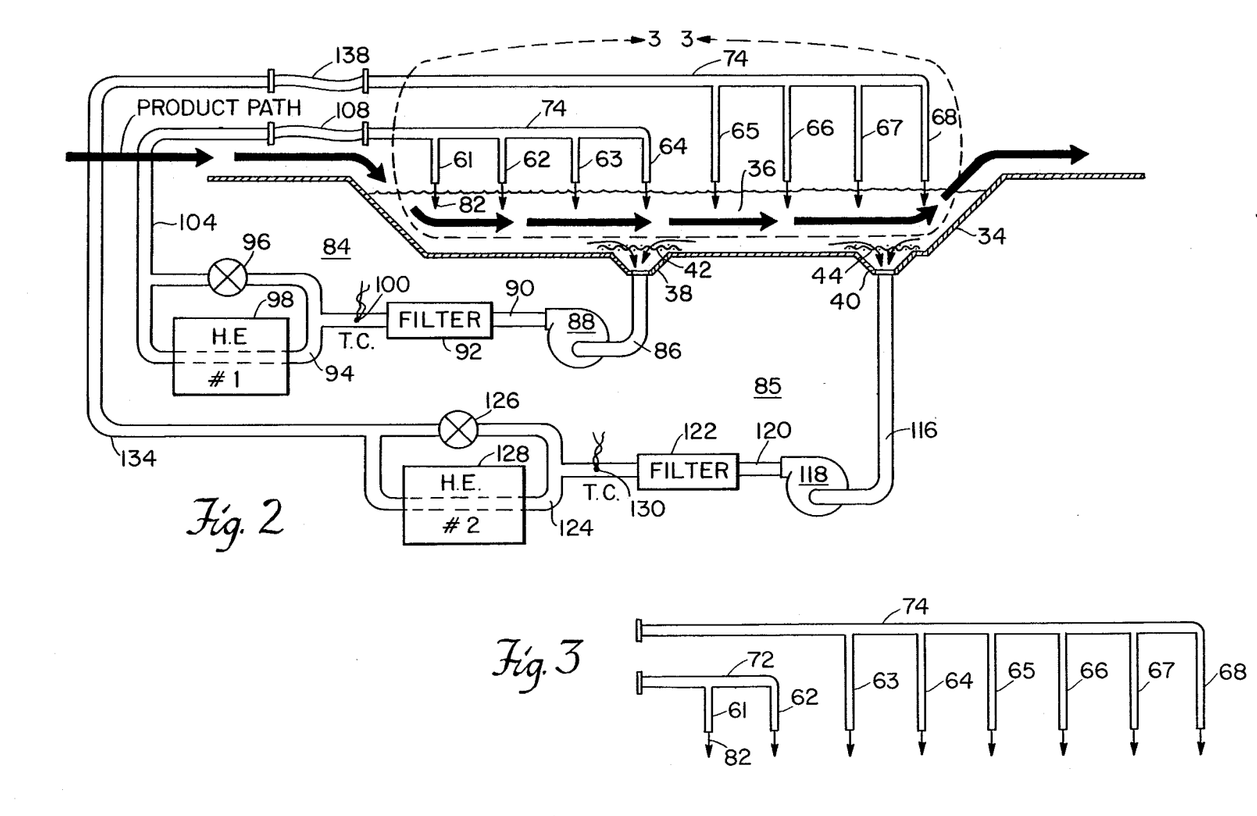
FIG. 2 is a mechanical schematic of the piping for the present invention.
FIG. 3 is an alternate embodiment of the piping for the present embodiment along line 3—3 of FIG. 2.

Referring to FIGS. 2 and 4, are the heat exchange systems 84 and 85 are shown. Connected to front drain 38 though drainpipe 86 is pump 88. Pump 88 is connected through pump output pipe 90 to filter 92. Filter 92 is optional. In place of filter 92, a sediment conveyor made of metal or paper material may be run along the floor of cooking oil tank 34. However, if filter 92 is used, it is preferably a centrifugal type filter to handle the volume of oil from pump 88.

Figures 6, 7, 10:
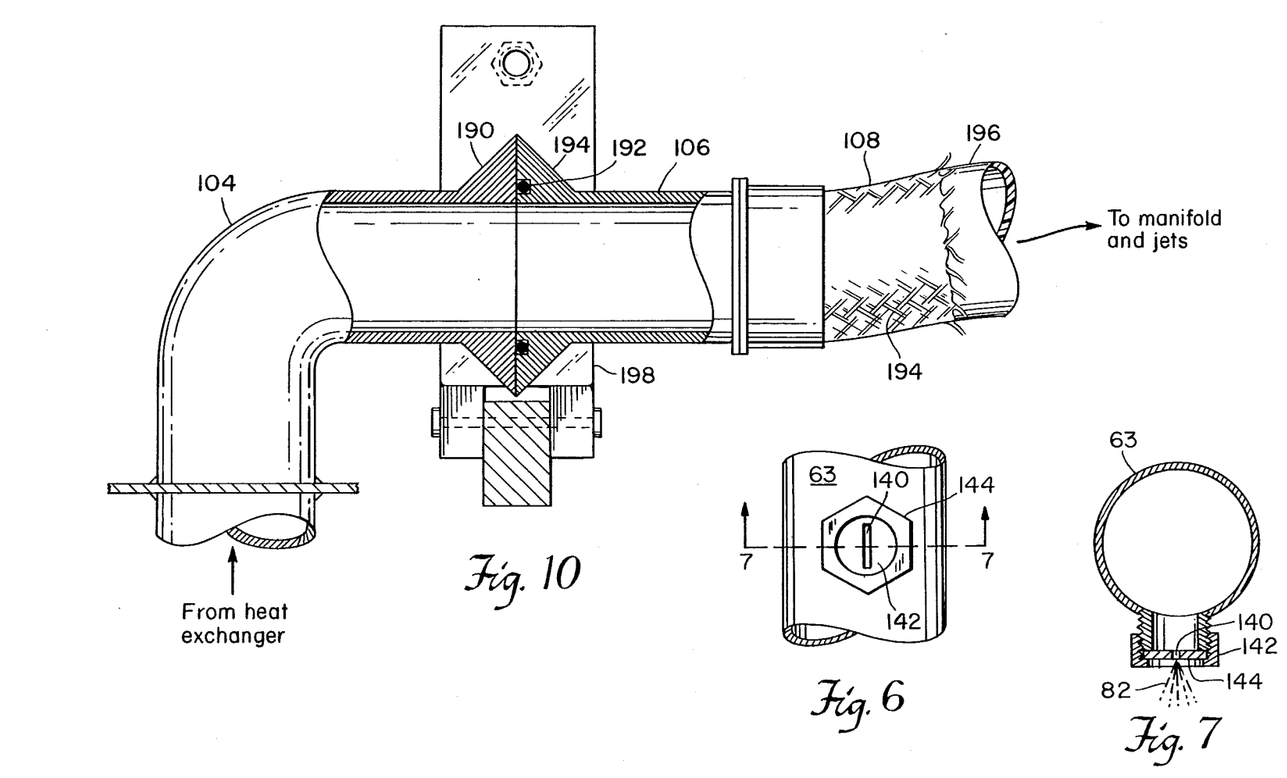
FIG. 6 is a bottom view of one of the nozzles connected to the manifold taken along line 6—6 in FIG. 5.
FIG. 7 is a cross-sectional view showing the nozzle taken along line 7—7 of FIG. 6.
FIG. 10 is a cross-sectional view of the connector assembly shown in FIG. 9 that connects the heat exchanger to the dispersing manifolds.
Figure 8:
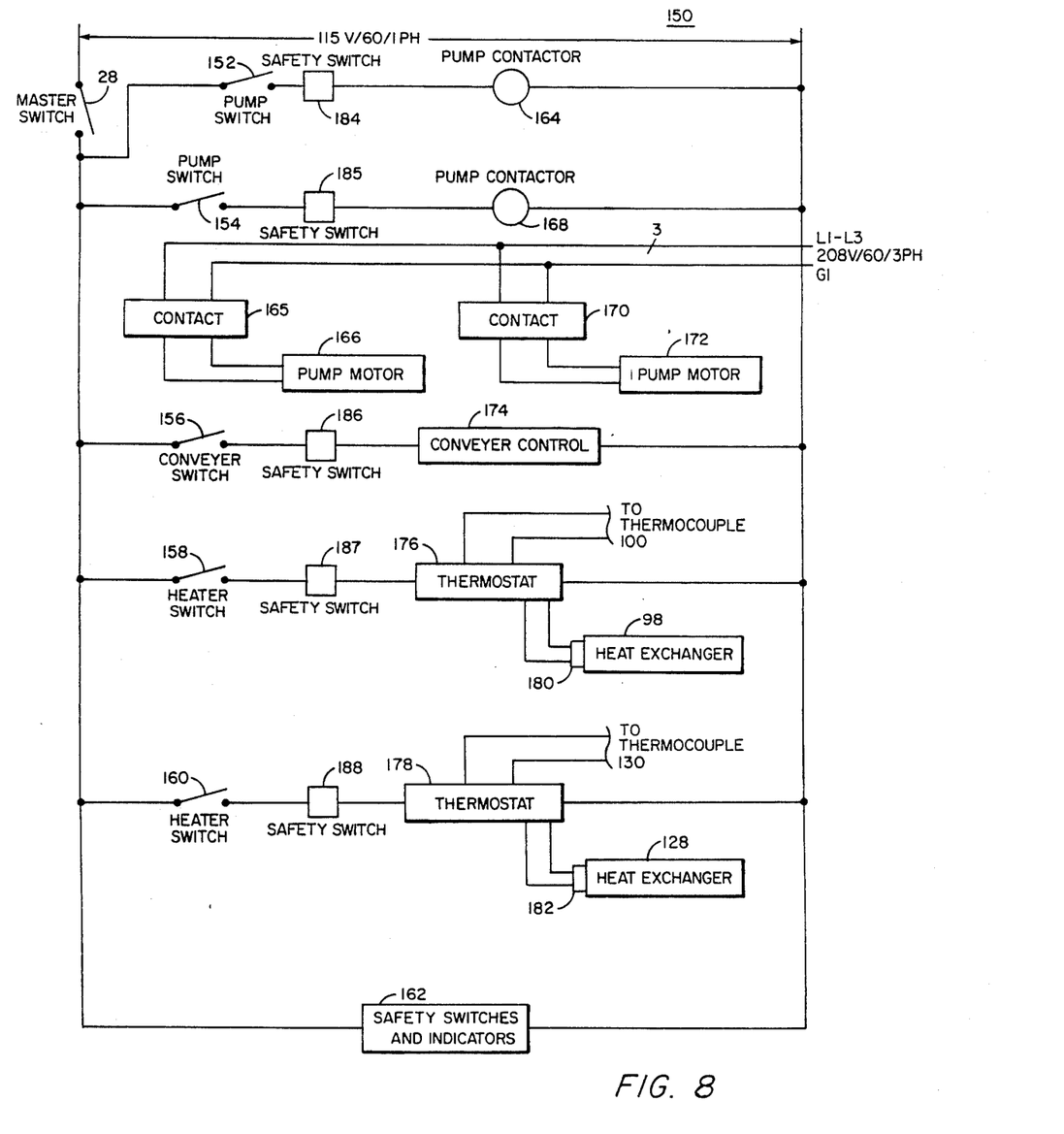
FIG. 8 is an electrical schematic of the wiring for the present invention.
Figure 9:
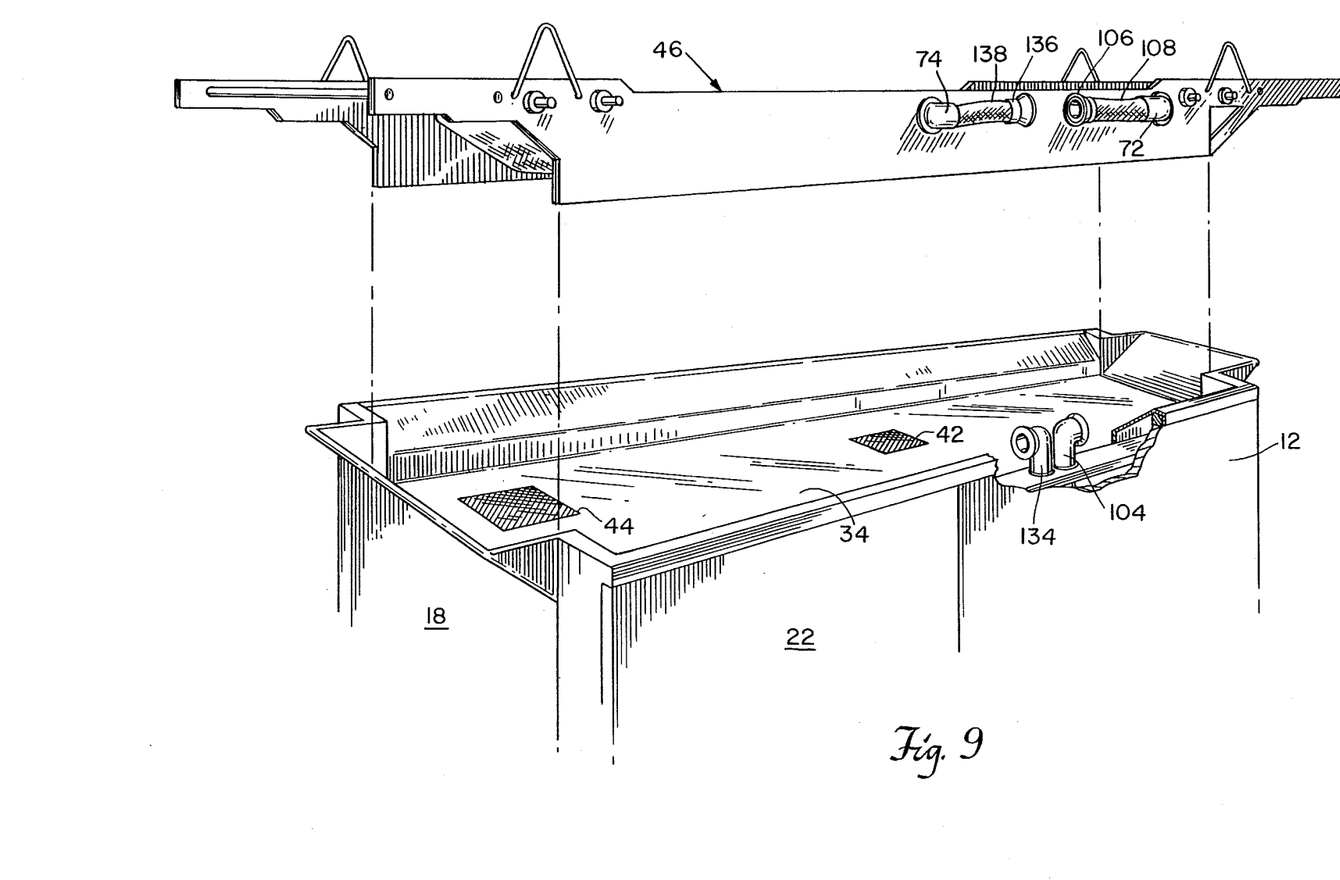
FIG. 9 is an enlargement of the fryer/cooker assembly having a connector assembly that enables removal of the conveyor and modified from the cooking tank assembly.

Filter 92 is connected to heat exchange inlet 94 which forks and connects to both bypass valve 96 and heat exchanger 98. Connected to heat exchange inlet 94 is thermocouple 100. This thermocouple 100 is electrically connected to thermostat 102 (FIG. 8) and measures the temperature within heat exchange inlet 94. Heat exchanger 98 and bypass valve 96 are connected to heat exchange pipe 104. Heat exchange pipe 104 is connected to a manifold interface pipe 106 (FIG. 10) that is built into the conveyor and manifold assembly 46. Heat exchange pipe 104 is connected to manifold interface pipe 106 in such a manner as to permit ease of disconnection of the conveyor and manifold assembly 46 from cooking oil tank 34. Manifold interface pipe 106 is connected to front manifold header 72 through flexible piping 108 (FIGS. 9, 10). Futher details of this connection will be explained later.

Connected to rear drain 40 is drain pipe 116 and pump 118. The output of pump 118 is connected through pump output pipe 120 to filter 122. The output of filter 122 is connected to heat exchange inlet 124 which forks and connects to bypass valve 126 and heat exchanger 128. Also connected to heat exchange inlet 124 is thermocouple 130. Thermocouple 100 is connected to thermostat 132 (FIG. 8). The output of bypass valve 126 and heat exchange 128 is connected through heat exchange pipe 134 to manifold interface pipe 136, flexible piping 138, and rear manifold header 74.

Front manifold header 72 and rear manifold header 74 are connected to dispersing manifolds 61–64, 85–68, respectively. These dispersing manifolds 61–68 spray hot oil into cooking oil tank 34.

Figure 5:
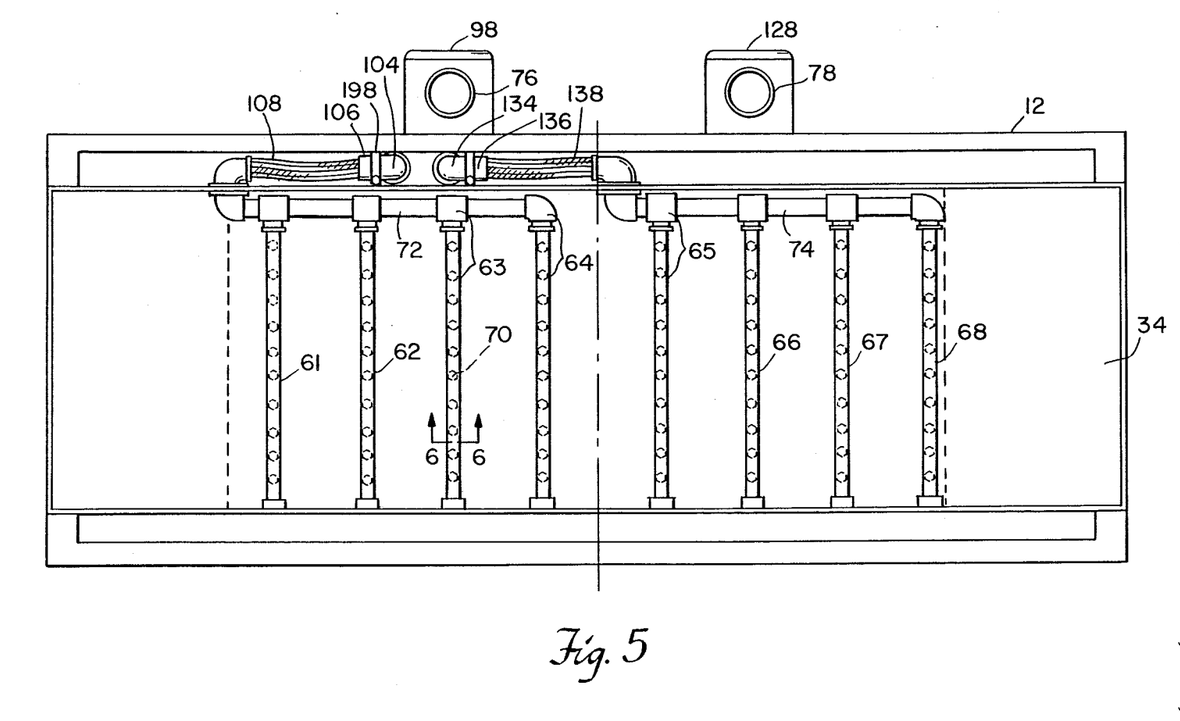
FIG. 5 is a top plane view showing the manifold pipe and aperture structure.

Referring to FIG. 5, the oil dispersing means is shown having a front and rear manifold 72 and 74 with respective dispersing manifolds 61–64, 65–68 connected thereto. Although the system shown has only a front manifold header 72 and a rear manifold header 74, the cooking oil tank 34 may easily be lengthened and contain multiple numbers of manifold headers with respective dispersing manifolds.

The front manifold header 72 and rear manifold header 74 are respectively connected to a flexible piping 108 and 138. Each respective flexible pipe 108 and 138 is connected through a manifold interface pipe 106 and 136 (FIG. 10) to the heat exchange pipe 98 and heat exchange pipe 134.

The dispersing manifolds 61–68 run laterally across the width of the cooking oil pan starting with the front manifold header 72 and rear manifold header 74 and ending with the side 35 of the cooking oil tank 34. These dispersing manifolds are preferably submerged in the oil 36. Evenly spaced within each dispersing manifold 61–68 is a plurality of nozzles 70, as shown in FIGS. 6 and 7. These nozzles 70 have an aperture or a slit 140 located on its bottom which allows oil to discharge 82 into the cooking oil tank 34. By evenly distributing the hot oil from the heat exchanger 98,128 to the cooking oil tank 34 through these nozzles 70, a substantially uniform temperature is maintained laterally across the cooking oil tank 34. This uniformly of heat allows the temperature of oil along the food product path to be constant even when frozen food is placed in the fryer.

During operation, heat exchange system 84 and heat exchange system 85 operate substantially identically. The flow of oil will be explained for heat exchange system 85. The oil from cooking oil tank 34 flows downward through rear particle screen 44 into rear drain 40 and then into drain pipe 116. The pump 118, which has typically a hundred gallon per minute capability, pumps the oil through pump output pipe 120 through centrifugal filter 122, filter pipe 122 and into heat exchanger 128. Heat exchange 128 is a very high-efficiency, gas operated fluid heater. Preferably, the equipment known as RADAR LINE, provided by the Raytheon Company, such as Mark 3000 Thermal Fluid Heater, is used. This heat exchanger 128 heats the oil by approximately 20° F. to a temperature of 300°–400° F. at a flow of 40–50 gallons per minute. The heated oil then flows through the heat exchange pipe 134 through flexible piping 138 and then into rear manifold header 74. Rear manifold header 74 then distributes this hot oil discharge 82 through dispersing manifolds 65–68 and nozzles 70 into the cooking oil tank 34. This oil discharge 82 is distributed in a uniform manner longitudinally and laterally within cooking oil pan. This cooking oil then flows downward from nozzles 70 through hold down and submerged portions 56 and 50 and then into drain 46 where the heat exchange cycle is repeated. A similar heat exchange cycle is also continuously run for heat exchange system 84.

If it is determined that more energy is needed to be available on the front end of cooking oil tank 34, bypass valve 96 will be manually opened. Opening valve 96 results in a higher flow of oil being drawn into drain 38 and a larger amount of oil flowing into cooking oil tank 34 through front manifold header 72 and its respective dispersing manifolds 61–63. In other words, by turning on bypass valve 96, a larger amount of energy is distributed to the front of cooking oil tank 34 from the rear of cooking oil tank 34. Similarly, if it is determined that more energy is needed to be available in the rear end of cooking oil tank 34, bypass valve 126 may be manually opened.

Referring to FIGS. 3 and 5, by rearranging the taps 63t and 64t on rear manifold header 74 and front manifold header 72 to have two dispersing manifolds 61 and 62 connected to heat exchange system 84 and six dispersing manifolds 63–68 connected to heat exchange system 85, an even larger amount of heat can be distributed to the front end of the cooking oil tank 34. These manifold connection changes can be easily obtained by replacing the right angle connector 65t on the rear manifold header 24 with a T-type connector and replacing the T-angle connector on the front manifold header 72 with a right-angle connector and repiping manifold headers 72 and 74, accordingly.

Referring to FIGS. 6 and 7, the hot oil discharge 82 is dispersed to the cooking oil tank 34 through slit in nozzle 70. Slit 140 is formed in a small piece of metal 142 which is held in place with hex nut 144. The slit 142 is rectangular shape to provide a spray that runs laterally along the cooking oil tank 34. Although a nozzle is preferred, spaced apertures in the dispersing manifold 61–68 that direct oil downward will heat the oil 36 in the cooking oil tank 34 uniformly.

Because of this particular configuration of laterally positioned dispersing manifolds 61–68 containing horizontal slits 140 that spray oil, the hot oil 36 is distributed uniformly from side to side of the cooking oil tank 34. Further, having a plurality of heat exchangers 98 and 128, each having their respective manifold headers 72 and 74 that force oil downward to a drain 38 and 40 connected to the same heat as the manifold headers 72 and 74, it is possible for the cooking oil tank 34 to have separate zones of substantially uniform temperature. This provides a cooking oil tank 34 with an easily adjustable temperature profile.

Referring to FIG. 8, there is shown the electrical block diagram of the conveyor, oil heating and distribution electronics 150. The conveyor, oil heating and distribution electronics 150 is disposed within control panel 26 and fryer base 12 and are wired to 115 volts, 60 hertz, 1 phase and a 208 volt, 60 hertz, 3 phase AC power line. Connected to the 115 volt line is a master switch 28 which enables power to the rest of the conveyor, oil heating and distribution electronics 150.

The master switch 28 is connected to pump switch 152, pump switch 154, conveyor switch 156, heater switch 158 and heater switch 160, and safety switches and indicators 162. Pump switch 152 is connected through safety switch 184 to pump contactor 164. Pump contactors 164 and 168 are connected to contacts 165 and 170, respectively. Pump switch 154 is connected through safety switch 185 to pump contactor 168. Conveyor switch 156 is connected to the conveyor control circuitry 174 through safety switch 187. Heater switch 158 controls electricity to thermostat 176 through safety switch 187. Heater switch 160 controls electricity to thermostat 178. Safety switches and indicators 162 signal to the fryer operator information about fryer operation to the user. This information includes the level of the oil, the pressure of various gases, the temperature limits on the switches. Safety switches 184–188 will shut down the fryer operation if preset limits are exceeded.

Connected to the 240 volt, 3 phase line are contacts 165 and 170. Contacts 165 and 168 are enabled when pump contactors 164 and 168 is enabled, respectively. Contact 165, when enabled, turns on motor 166 and contact 170, when enabled, turns on motor 172.

The conveyor control circuitry 174 enables transport conveyor 47 in conveyor and manifold assembly 46 and sets the speed thereof. The conveyor control 174 also has automatic shut-off circuitry in case of an overload or a jam of any of the conveyors.

Thermostat 176 is connected to a firing module 180 on heat exchanger 98. Thermostat 176 is also connected to thermocouple 100. When thermostat 176 receives a signal from thermocouple 100 that the temperature flowing through heat exchange inlet 94 has heated and reached a predetermined temperature, the heat exchanger 98 will be turned off by thermostat 176. When the thermostat 100 indicates that the temperature in heat exchange inlet 94 has cooled off to a second predetermined temperature, the firing module 180 will be turned on, which will fire up the heat exchanger 98.

Thermostat 178 is connected to thermocouple 130 and firing module 182. Firing module 182 is connected to heat exchanger 128. Thermostat 178 works identically to the thermostat 176.

Referring to FIG. 9, there is shown a conveyor and manifold assembly 46 raised above a fryer base 12. The conveyer and manifold assembly 46, when lowered, will seat on the floor of cooking oil tank 34. Disposed about the back side of the conveyor and manifold assembly 40 are manifold interface pipes 106 and 136 which connect to flexible piping 108 and 138. Welded into the cooking oil tank 34 is heat exchange pipe 104 and 134. When conveyor and manifold assembly 46 are lowered into the fryer base 12, the heat exchange pipes 104 and 134 will connect to the manifold interface pipes 106 and 136, as shown in FIG. 10.

Referring to FIG. 10, there is shown the connection between heat exchange pipe 104 and a manifold interface pipe 106. The heat exchange pipe 104 is integrally connected to a V-flange 190. The manifold interface pipe 106 contains to an O-ring 192 and a second V-flange 194. The manifold interface pipe 106 is a flexible piping 108. This connector has a wire mesh cover 194 surrounding a TEFLON pipe 196. This pipe 196 and mesh cover 194 are connected directly to the manifold header 72. The first V-flange 190 is clamped to the second V-flange 194. O-ring 192 seals the connection of manifold interface pipe 106 and the heat exchange pipe 104. A clamp 198 is used to hold the heat exchange pipe 104 and manifold interface pipe 106 in place.

By having a easily disconnectable interface, manifolds 106 and 136 which mate with heat exchange pipes 104 and 134, the conveyor and manifold assembly 46 can easily be lifted out and removed from the cooking oil tank 34 for cleaning. This set up further allows easy cleaning as the cooking oil tank 34 contains no piping in which residue or charring can form. Further, soap and water can easily be run through the dispersing manifold 61-68 and manifold headers 72 and 74 to flush out oil in cleaning of the fryer/cooker assembly 10. Also, discharge from the dispersing manifolds 61-68 may be used in conjunction with running transport conveyor 47 to clean the belts.

This concludes the Description of the Preferred Embodiments. A reading of those skilled in the art will bring to mind many modifications and alternatives without departing from the spirit and scope of the invention. Accordingly, it is intended that the invention only be limited by the following claims.

What is claimed is:

1. A fryer assembly comprising:
   a tank containing cooking oil, said tank having a bottom;
   means for draining oil from the bottom of said tank;
   heat exchanger means for heating said oil drained from said tank to a predetermined temperature;
   means for directing said heated oil downward into said tank from above said food and above said drain wherein the flow of oil in said tank is substantially downwardly from said directing means to said drain;
   conveyer means for transporting food through said oil in said tank between said directing means and said draining means; and
   means for submerging said food in said cooking oil when said food is being transported.

2. The apparatus as recited in claim 1 further comprising thermostat control means sensitive to the temperature of said cooking oil; and
   control means, electrically connected to said thermostat control means and said heat exchange means for energizing said heat exchange means when the temperature of said cooking oil drops.

3. The apparatus as recited in claim 1 further comprising means disposed between said draining means and said heat exchange means for filtering particles of food out of said drained oil.

4. The apparatus as recited in claim 1 wherein said directing means comprises a plurality of manifolds mounted within said tank for easy removal therefrom.

5. The apparatus as recited in claim 1 further comprising means for bypassing said heat exchanging means to transfer heat from one part of said tank to another part of said tank.

6. A fryer for cooking food comprising:
   a tank having a first region and a second region containing cooking oil;
   first conveyor means mounted with said tank for transporting food along a path through said cooking oil in said first and second region;
   first means for draining cooking oil disposed within said region from said tank;
   first heat exchanger means for heating said cooking oil drained from said first region to a first predetermined temperature;
   first cooking oil directing means for distributing said heated oil into said tank so as to maintain a first substantially uniform temperature zone within said cooking oil in said first region and along the path of food flow when said food is moved through said first region, and for directing said oil heated by said first heat exchange means into said tank, wherein said first conveyer means transports food between said first directing means and said first draining means;
   second means for draining cooking oil disposed within said second region from said tank;
   second heat exchange means for heating said cooking oil drained from said tank second region to a second predetermined temperature; and
   second cooking oil directing means for distributing said cooking oil heated by said second heat exchange means into said tank so as to maintain a second substantially uniform temperature zone within said cooking oil in said second region and along the path of food flow when said food is moved through said second region, and for directing said oil heated by said second heat exchange means into said tank wherein said first conveyor means transports food between said second directing means and said second draining means.

7. The apparatus as recited in claim 6 wherein said first and second first directing means includes a pipe having at least one aperture directing said heated oil downward into said cooking oil in said tank and over said food.

8. The apparatus as recited in claim 7 wherein said pipe extends laterally across said tank.

9. The apparatus as recited in claim 8 wherein said temperature of said heated oil within said first and second region, each vary by less than 10° F.

10. The apparatus as recited in claim 6 further comprising a second conveyor means for holding said food submerged within said cooking oil while being transported on said first conveyor.

11. The apparatus as recited in claim 6 further comprising means disposed between said first pumping means and said heat exchanger means for filtering food particles out of said cooking oil.

12. The apparatus as recited in claim 6 further comprising means for allowing said drained cooking oil to bypass said first heat exchanger means such that heat can be transferred from one section of the tank to another.

13. The apparatus as recited in claim 7 wherein said first directing means is mounted within said tank for easy removal therefrom.

14. The apparatus as recited in claim 1 wherein said directing means from uniform temperature zones that extend laterally across said tank and perpendicular to the flow of food so as to maintain a constant heating pattern within said cooking oil while food is being transported.

15. The apparatus as recited in claim 6 further comprising second thermostat control means sensitive to the temperature of said cooking oil within said second temperature region; and control means, electrically connected to said second heat exchange means and said second thermostat means, for energizing said second heat exchange means when the temperature of said cooking oil in said second temperature region drops below a third predetermined temperature.

16. The apparatus as recited in claim 6 wherein said first and second directing means includes a pipe extending laterally across said second tank having a plurality of apertures directing heated oil downward into said cooking oil in said tank and over said food.

17. A fryer for cooking food comprising:
a tank containing cooking oil;
first conveyer means for transporting food into said cooking oil;
means for pumping cooking oil into and out of said tank;
a first and second heat exchange means for heating said pumped cooking oil to a predetermined temperature;
cooking oil dispersing means having a first manifold configuration for distributing said heated cooking oil into said tank, said first manifold configuration having a first dispersing manifold having a plurality of apertures directing said pumped cooking oil heated by said first heat exchange means into said cooking oil in said tank and around said food, said first manifold configuration having a second dispersing manifold with a plurality of apertures directing said pumped cooking oil heated by second heat exchanging means in said tank and around said food; and
means for disposing said dispersing manifold in a second manifold configuration wherein said first dispersing manifold directs said pumped oil heated by said first heat exchanger mean into said tank at a different location than where said first dispersing manifold directs said oil when in said fist manifold configuration.

18. The fryer as recited in claim 17 wherein said dispersing means and said conveyer means are attached to said tank for easy removal therefrom.

19. The apparatus as recited in claim 1 wherein said directing means comprises a plurality of apertures that are disposed within said cooking oil.

20. The apparatus as recited in claim 10 wherein said second conveyer means has a continuous circular belt having a bottom portion that holds down said food in said oil and a top portion that is disposed above said oil, and wherein said directing means is disposed between said top and bottom portion.

21. The fryer as recited in claim 17 further comprising:
first and second thermostat control means sensitive to the temperature of said cooking oil in different parts of said tank; and
control means, electrically connected to said first and second heat exchange means and said first and second thermostat means, for energizing said first heat exchange means in response to said first thermostat control means and for energizing said second heat exchange means in response to said second thermostat means.

22. The fryer as recited in claim 17 further comprising:
means for disposing said dispersing manifolds in said second manifold configuration wherein said second dispersing manifold directs said pumped oil heated by said second heat exchanger means into said tank at a different location than where said second dispersing manifold directs said oil in said first manifold configuration.

23. A fryer assembly comprising:
a fryer base comprising:
(a) a tank containing cooking oil;
(b) means for draining said cooking oil from said tank;
(c) heat exchanger means for heating said oil drained from said tank;
an assembly disposed on said tank comprising:
(a) conveyer means for transporting food through said cooking oil in said tank;
(b) manifold means for directing said heated oil into said tank; and
said conveyer means being attached to said manifold means for removal intact as an assembly from said tank.

24. The fryer as recited in claim 23 wherein said tank has a floor and wherein said assembly is supported by the floor of said tank.

25. The fryer as recited in claim 23 wherein said assembly lifts out of said tank.

26. The fryer as recited in claim 23 wherein said manifold means directs oil downward into said tank and over said food on said conveyer means.

* * * * *